United States Patent [19]
Novak et al.

[11] Patent Number: 5,747,618
[45] Date of Patent: May 5, 1998

[54] ALLENE/ALKYNE COPOLYMERS

[76] Inventors: Bruce M. Novak, 495 Old Farm Rd.; Mitsuru Nakano, 500 Riverglade Dr. #K, both of Amherst, Mass. 01002

[21] Appl. No.: 724,164

[22] Filed: Sep. 27, 1996

[51] Int. Cl.$^6$ ............................................. C08F 238/02
[52] U.S. Cl. ............... 526/285; 526/115; 526/154; 526/171; 526/172; 526/335; 526/336; 526/339; 526/340
[58] Field of Search ................... 526/285, 335, 526/336, 171, 172, 339, 340

[56] References Cited

U.S. PATENT DOCUMENTS

| | | |
|---|---|---|
| 3,679,722 | 7/1972 | Tsai. |
| 4,496,700 | 1/1985 | Colon ........................ 526/111 |
| 4,983,460 | 1/1991 | Balanzat ...................... 428/421 |

OTHER PUBLICATIONS

Chien et al., "Electrically Conducting ... Synthesis and Properties", *Macromolecules*, 14:479–485, (1981).
Dawans et al., "BIS(π–Allylnickel Haloacetates)", *Journal of Organometallic Chemistry*, 21:259–261, (1970).
McGrath et al., "Functionalization of Polymers by Metal–Mediated Processes", *Chemical Reviews*, 95:381–398, (1995).
Otsuka et al., "Crystalline 1,2–Polyallene", *Journal of the American Chemical Society*, 87:3017–3019, (1965).
Van Koten et al., "1,4–Diaza–1,3–butadiene . . . of Their Metal Complexes", *Advances in Organometallic Chemistry*, 21:151–239, (1982).
Copy of PCT Search Report for PCT/US96/15650.
Odian "Principles of Polymerization", (1991), 437, Wiley, (New York).

*Primary Examiner*—Fred Zitomer
*Attorney, Agent, or Firm*—Fish & Richardson P.C.

[57] ABSTRACT

The invention features linear copolymers prepared from mixtures of allenes and alkynes. The new copolymers have the formula:

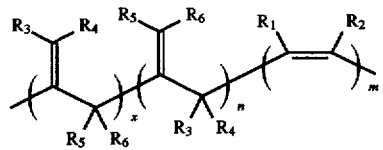

wherein $R_1$ through $R_6$ are, independently, H, an alkyl, an aryl, a phenyl or substituted phenyl, an alkoxy, or an aryloxyl, x+n is 1 to 10,000, and m is 1 to 10,000. The invention also features efficient methods of preparing the new copolymers using nickel or palladium catalysts.

25 Claims, 5 Drawing Sheets

ALLENE/ALKYNE COPOLYMERS

STATEMENT AS TO FEDERALLY SPONSORED RESEARCH

This invention was made with Government support under grant number DMR-9350473 awarded by the National Science Foundation. The Government has certain rights in the invention.

BACKGROUND OF THE INVENTION

The invention relates to new copolymers made from substituted and unsubstituted allenes and alkynes, and efficient copolymerization methods to prepare these new copolymers.

Advanced olefin polymers have been polymerized using early transition metal catalysts, such as metallocene catalysts. Although stereoregularities of polyolefins can be controlled by metallocene catalysts, functionalized polyolefins are quite difficult to make using these catalysts. Thus, other techniques have been developed to prepare functionalized polyolefins. For example, one technique is to modify unsaturated prepolymers such as 1,4-polybutadiene to synthesize functionalized polyolefins (see, e.g., M. P. McGrath et al., *Chem. Rev.*, 95:381–198, 1995). Another technique is free radical grafting of maleic anhydride onto polyolefins.

Allene ($C_3H_4$, also known as propadiene), the simplest cumulene, is an attractive monomer candidate in the manufacture of polyolefins such as polypropylene, because polyallene is a versatile intermediate polymer "blank." Long ago, Otsuka et al., *J. Am. Chem. Soc.*, 87: 3017–3019 (1965), reported that certain nickel complexes, mainly allyl nickel bromide, could be used to polymerize allene. In addition, conventional Ziegler-Natta catalysts have been used to polymerize propyne. For example, Chien et al., *Macromolecules*, 14:479–485 (1981), described propyne polymerization using $Ti(O-n-Bu)_4/Et_3Al$ to produce an acetylene/propyne (methylacetylene) copolymer.

Allene is produced in large quantities as a byproduct ($C_3H_4$) of petroleum cracking plants, e.g., as a result of ethylene or gasoline production. However, the $C_3H_4$ byproduct is a mixture of about 60% allene and 40% propyne, which is very difficult to separate into the two separate isomers. This byproduct is currently treated as waste and simply burned.

SUMMARY OF THE INVENTION

The invention is based on the discovery that certain nickel or palladium catalysts can be used to polymerize new linear, elastomer copolymers from mixtures of allenes (e.g., allene or substituted allenes), such as methyl allene, and alkynes (e.g., acetylene and substituted alkynes), such as propyne. These new copolymers include both internal and terminal olefins, making them polyolefin precursors that are readily modified, since each type of olefin provides a different reactivity for modifications. Moreover, the new method provides an environmentally friendly and commercially attractive use for the large quantity of $C_3H_4$ produced by the petroleum industry, which until now has been burned as a waste product.

In general, the invention features linear copolymers, e.g., of mixtures of alkynes having the formula $R_1—C\equiv C—R_2$, e.g., propyne, and allenes having the formula:

wherein $R_1$ through $R_6$, independently, are H; an alkyl, e.g., $C_aH_{2a+1}$, where a is 1 to 20 or higher; an aryl, e.g., phenyl or substituted phenyl, e.g., substituted with $CH_3$, $CF_3$, or $Si(CH_3)_3$; an alkoxy, e.g., $OC_aH_{2a+1}$, where a is 1 to 20, or higher; an aryloxyl, e.g., or

In addition, the $R_3$ (or $R_4$) and $R_5$ (or $R_6$) can be connected to each other to form cyclic allenes.

These new copolymers have the formula:

wherein $R_1$ to $R_6$ are as defined above, x+n is 1 to 10,000, and preferably 20 to 2500, and m is 1 to 10,000, and preferably 20 to 2500. For example, if one uses 100 units of the alkyne and 50 units of the allene, one obtains 150 units of the copolymer, and the number of repeats for each unit is the same as the number of monomers used in the polymerization. In addition, the three units shown in the general structure above can be randomly distributed within the copolymer.

In particular embodiments, the copolymer is made of an unsubstituted allene and an acetylene, 1-pentyne, 2-pentyne, or phenylacetylene. In another embodiment, the allene is $CH_3CH=C=CH_2$, and the alkyne is propyne. When the copolymer is made from unsubstituted allene and propyne, the formula is:

In another aspect, the invention features a method of preparing a copolymer of an allene and an alkyne, by obtaining a solution of a nickel or palladium catalyst, e.g., an allyl nickel or palladium catalyst, in a solvent; adding to the solution a mixture of an allene and an alkyne; stirring the solution at a temperature of at least −20° C. for a time sufficient to produce a copolymer; and isolating the copolymer from the solution.

The general formula of the allyl nickel or palladium catalyst and the formula of a preferred allyl nickel catalyst are as follows:

wherein M is nickel or palladium, and X is a counterion; e.g., a carboxylate, such as an acetate or a benzoate; a halogen ion, e.g., fluorine, chlorine, or bromine; or a halogen ion-containing compound, e.g., $PF_6^-$ or $BF_4^-$. A preferred one of these catalysts is $[(N^3\text{-allyl})Ni \text{ (trifluoroacetate)}]_2$ (ANiTFA).

The catalyst also can be a nickel or palladium complex (neutral or cationic) with a diimine ligand having the formula:

wherein M is nickel or palladium; Y is a halogen or alkyl, or, in the case of cationic complexes, Y can be a solvent such as diethyl ether that weakly coordinates to the metal center; and $R_1$ and $R_2$ are, independently, H; an alkyl, e.g., $C_aH_{2a+1}$, where a is 1 to 20 or higher; or an aryl, e.g., phenyl. The Rs can also be the same, e.g., H or phenyl, or can be linked to form bisiminoacenaphthyl.

In the cationic form, the formula above has a positive charge, and is activated by methylaluminoxane (MAO) (Aldrich Chemical Co., Inc., Milwaukee, Wis.), or an aryl borate anion ($Ar'_4B^-$), which is an aromatic ring, preferably with an electron withdrawing substituent such as a —$CF_3$ group, e.g., In another aspect, the invention features a method of polymerizing a $C_3H_4$ byproduct of petroleum cracking (e.g., a mixture of unsubstituted allene and propyne), by using this byproduct as the allene and alkyne mixture in the methods of the invention.

The new process and new copolymers are environmentally friendly for two reasons. First, the new process uses a starting material that is presently a waste stream of petroleum cracking. Second, the new copolymers are free of halogens and thus do not pollute even if burned, and are easily recycled. The new copolymers can be used extensively in manufactured products such as car interior trim materials and external parts such as bumpers.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, the preferred methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

The invention is based on the discovery that certain nickel and palladium catalysts can be used to prepare new copolymers from mixtures of allene or substituted allenes, and alkynes, such as propyne. The new methods provide new, economical, and readily modified polyolefin precursors, while simultaneously providing a method of utilizing $C_3H_4$ waste streams produced as a byproduct of petroleum cracking.

Allene/Alkyne Copolymerization

The new methods use nickel or palladium catalysts, e.g., allyl nickel complexes such as $[(N^3\text{-allyl})Ni(\text{trifluoroacetate})]_2$ (I) as the catalyst for copolymerization of mixtures of allenes and alkynes. Catalyst I can be prepared according to the method described in Dewans et al., J. Organomet. Chem. 21:259 (1970). Briefly, 0.3 g of allyltrifluoroacetate (Aldrich) in ether (50 ml) was added to 0.5 g $Ni(cyclooctadiene)_2$ (Aldrich) and stirred for two hours at 0° C. to allow the reaction to go to completion. The ether (solvent) was removed with a pump, and the remaining crystal was washed three times with cold n-hexane at −78° C. The desired catalyst was obtained by drying under vacuum (yield about 80%).

Typical polymerization conditions are as follows, and are conducted using standard Schlenk line and glovebox techniques to keep all manipulations under a nitrogen atmosphere with the rigorous exclusion of air and water. The catalyst is first dissolved in a hydrocarbon solvent to form a solution at a concentration of about 1.0 to 100 mmol/liter.

Useful hydrocarbon solvents include toluene and benzene. Halogenated solvents, e.g., chlorinated solvents such as $CHCl_3$ or $CH_2Cl_3$, can also be used. For example, toluene can be distilled from sodium benzophenone ketyl before use. Halogenated solvents, e.g., chlorinated solvents such as $CHCl_3$ or $CH_2Cl_3$, can also be used.

A mixture of an allene (or a substituted allene) and an alkyne is introduced to the catalyst solution under an inert atmosphere using standard techniques, e.g., vacuum transferral. The starting monomers are preferably pretreated to remove all traces of water, which would otherwise decrease the catalytic activity of the catalyst. For example, allenes can be dried over molecular sieves (3A) at room temperature for a week, and alkynes, e.g., propyne, can be dried over $CaH_2$ for a few days. All monomers are preferably degassed by several freeze-pump thaw cycles before use in the polymerization reaction.

The monomer feed ratio (allene:alkyne) can vary widely from 100:0 to 20:80, but is preferably at least 30:70, because if the allene monomer is present in an amount less than 30%, the resulting copolymer yield will be decreased.

The mixture is then stirred, e.g., by a magnetic stir bar, for several hours, e.g., from 3 to 24 or more hours (depending on the temperature and the monomer/catalyst ratio, which can vary widely and is preferably between about 50/1 to 10,000/1), e.g., at least about 20 hours at room temperature, or at least about 3 hours at 40° C., to produce the new copolymer. The temperature can range from −20° C. to 80° C., and is preferably between 30° C. and 60° C., e.g., 40° C.

The copolymer can be isolated by standard techniques, such as by precipitation to methanol.

The results of the copolymerization can be monitored using standard techniques such as NMR analysis. For example, each copolymerization reaction in an air-free NMR tube can be monitored in deuterated toluene (toluene-$d_8$) by $^1H$ NMR spectroscopy at room temperature. Molecular weights and polydispersity indices (PDIS) can be determined by gel permeation chromatography (GPC) relative to polystyrene standards in tetrahydrofuran (THF). $^1H$ and $^{13}C$ NMR spectra of the obtained polymer can be taken in toluene-$d_8$ or $CDCL_3$.

EXAMPLES

Example 1—Allene/Propyne Copolymerization

In a glovebox, 4.0 mg of catalyst I, 0.5 ml of toluene, and a magnetic stir bar were placed in a 30 ml thick-walled glass tube. The tube was connected to a vacuum line, and an allene/propyne mixture (allene/propyne ratio=57/43, which is essentially the same as the ratio of allene/propyne in petroleum cracking waste streams of $C_3H_4$) was vacuum transferred into the reaction mixture under inert atmosphere. After stirring at 40° C. for about 3 to 5 hours, a yellow copolymer with a molecular weight of about 11,000 (measured by GPC) was produced and isolated by precipitation to methanol. The yield was directly proportional to the amount of starting monomers. For example, 0.5 g of each monomer produced 1.0 g of the copolymer.

The copolymerization was monitored by $^1H$ and $^{13}C$ NMR spectroscopy, which confirmed that the resulting yellow copolymer was indeed a copolymer, and not a mixture of homopolymers, because: 1) the propyne did not homopolymerize using catalyst I under the same conditions, 2) the propyne-to-copolymer conversion rate was almost the same as that of the allene-to-copolymer conversion rate throughout the copolymerization, and 3) a GPC trace of the resulting copolymer was found to be unimodal, i.e., not a mixture of copolymer and/or homopolymers, with a reasonably narrow PDI of 2.2.

Figure 1:
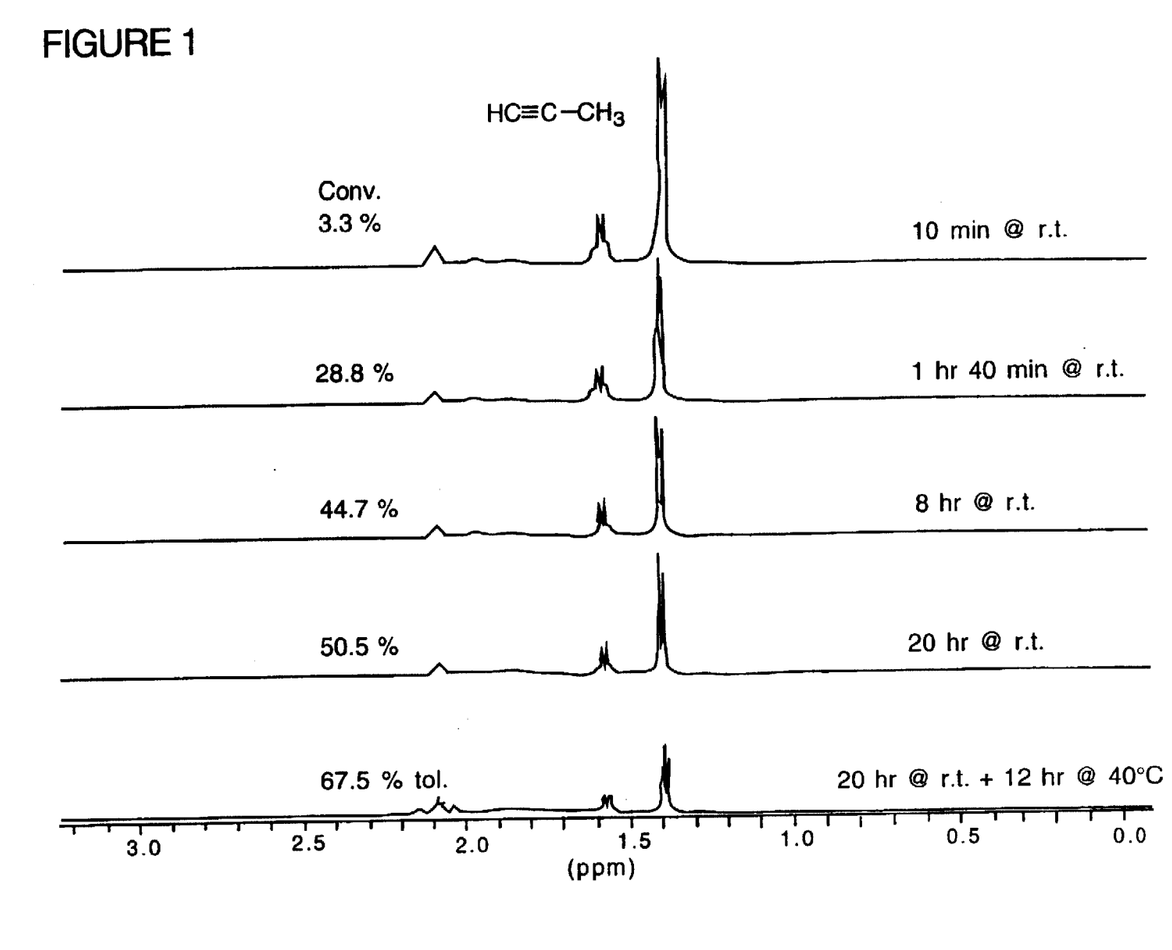
FIG. 1 is a series of $^1H$ NMR spectra of an attempted propyne homopolymerization over 32 hours catalyzed by $[(N^3\text{-allyl})Ni(\text{trifluoroacetate})]_2$ (ANiTFA) in toluene-$d_8$ at room temperature.

Specifically, as shown in FIG. 1, $^1H$ NMR signals at 1.40 ppm and 1.59 ppm, which are characteristic of the methyl protons and the methyne proton of propyne, respectively, decreased slowly, but no propyne homopolymer peaks were observed even after 20 hours of mixing at room temperature followed by 12 hours at 40° C. These results indicate that the propyne monomer does not homopolymerize in the presence of catalyst I.

Figure 2:
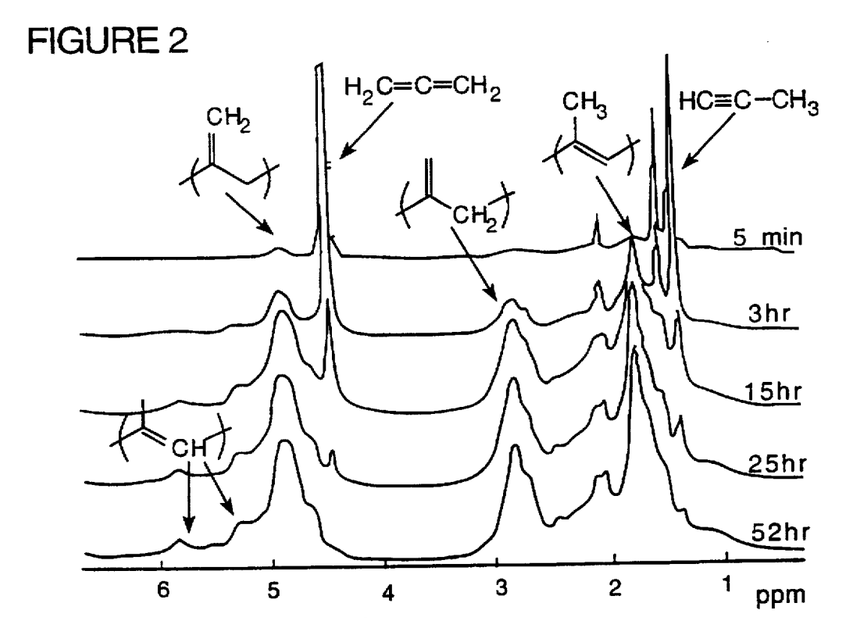
FIG. 2 is a series of $^1H$ NMR spectra of allene/propyne copolymerization over 52 hours catalyzed by $[(N^3\text{-allyl})Ni(\text{trifluoroacetate})]_2$ (ANITFA) in toluene-$d_8$ at room temperature.

However, the allene and propyne monomers were successfully copolymerized. FIG. 2 shows the $^1H$ NMR spectra of the allene/propyne mixture with catalyst I in toluene-$d_8$ at room temperature after different periods of time ranging from 5 minutes to 52 hours of mixing. The monomer feed ratio was allene:propyne=57:43. Each monomer was efficiently consumed, giving broad peaks attributed to both polymer units of the copolymer. In particular, $^1H$ NMR signals at 4.9 ppm and 2.9 ppm correspond to exo-methylenes and main chain methylenes, respectively. Strong peaks at 1.8 ppm and small peaks at about 5.3 and 5.9 ppm are characteristic of the methyl substituents and methynes along the backbone of the copolymer, respectively.

Figure 3:
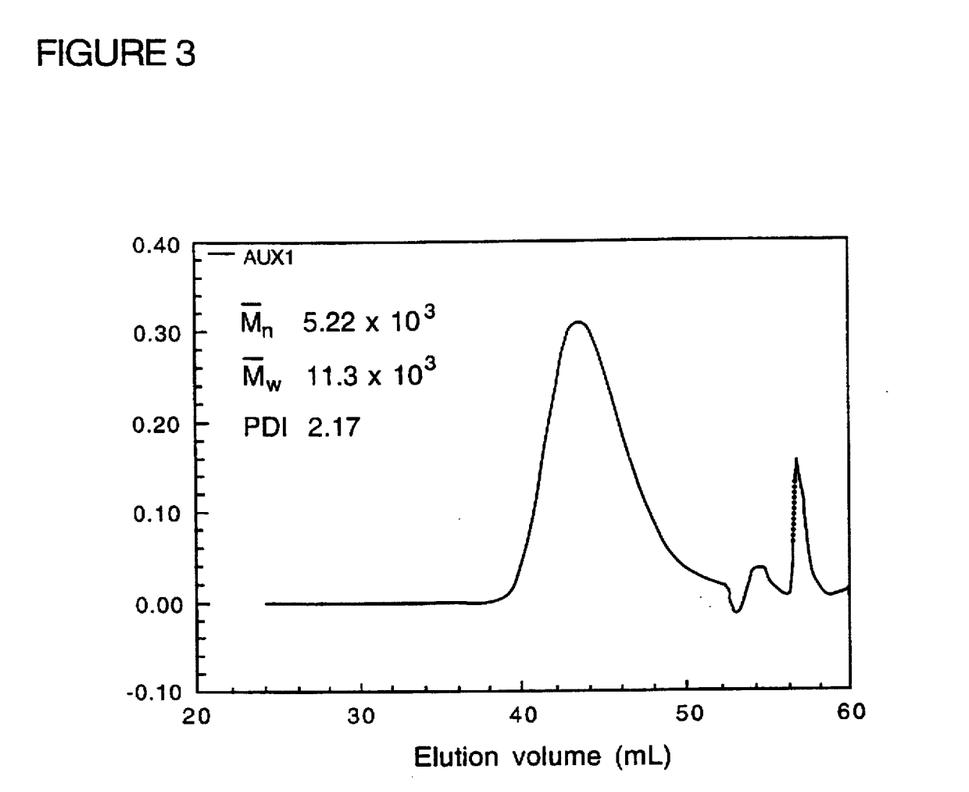
FIG. 3 is a gel permeation chromatography (GPC) trace of allene/propyne copolymerization catalyzed by (I) in the eluent THF.

Gel permeation chromatography (GPC) analysis provided evidence that the polymer was a true, unimodal allene/propyne copolymer. The GPC trace in FIG. 3 shows a unimodal peak with a reasonably narrow molecular weight distribution and PDI of 2.2 calculated based on polystyrene standards having known molecular weights. This trace indicates that the polymer was a true copolymer. On the other hand, a bimodal or unimodal trace having a broad PDI (more than about 3 or 4) would indicate a mixture of homopolymers and/or copolymers. The small secondary peaks on the right side of FIG. 3 are due to the solvent.

Figure 4:
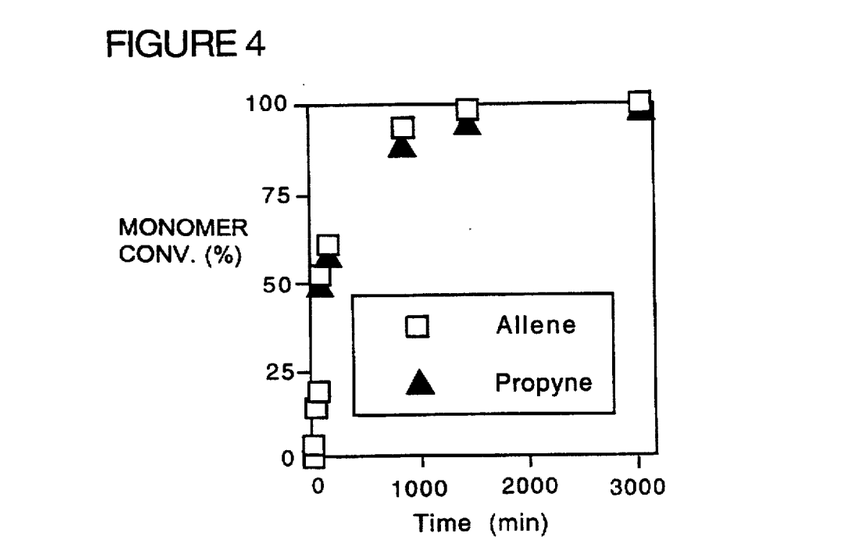
FIG. 4 is a graph showing time-conversion curves of allene/propyne copolymerization catalyzed by I in toluene-$d_8$ at room temperature.

In addition, as shown in FIG. 4, the propyne conversion rate was almost same as the allene conversion rate throughout copolymerization. FIG. 4 is a graph showing time-conversion curves (percentage of monomer conversion) of allene/propyne copolymerization catalyzed by I in toluene-$d_8$ at room temperature from 0 to 3000 minutes.

Figure 5A:
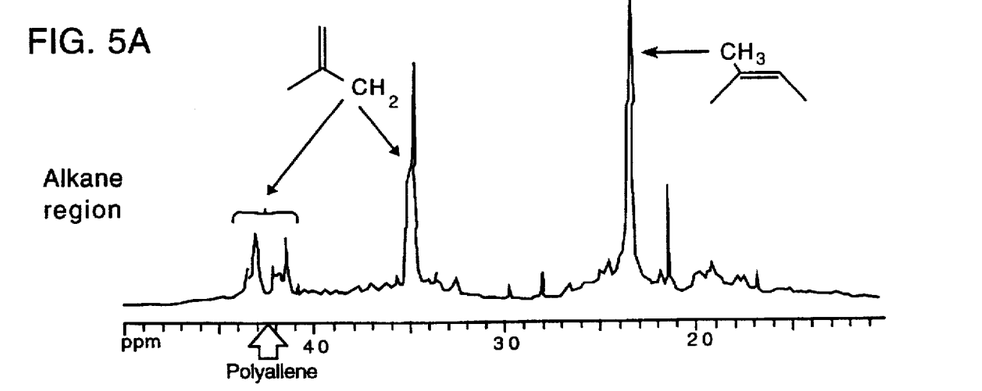
FIGS. 5A and 5B are two $^{13}C$ NMR spectra of the alkane region and the alkene region, respectively of the allene/propyne copolymer to confirm the copolymer formation.
Figure 5B:
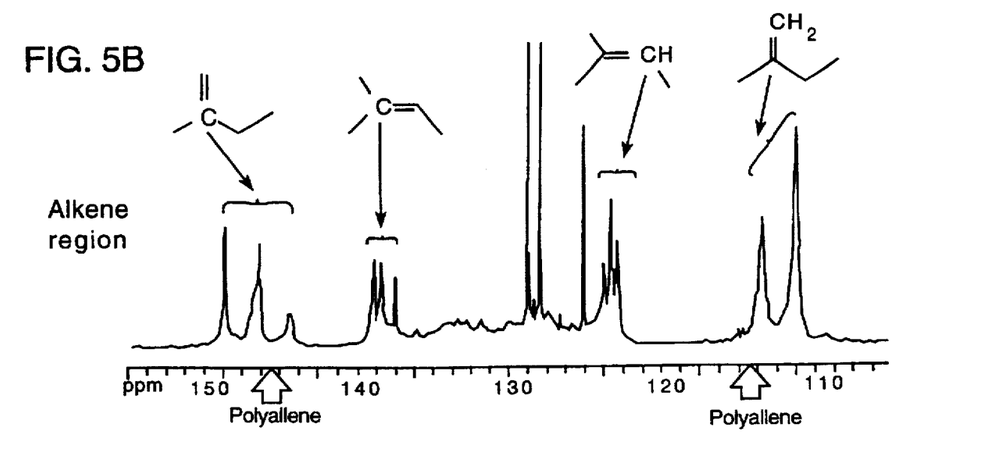

Further evidence of the true copolymer nature of the allene/propyne copolymer came from $^{13}C$ NMR studies. FIGS. 5A and 5B show NMR traces of the alkane and alkene regions of the allene/propyne copolymer, respectively. As shown in FIGS. 5A and 5B, there are no peaks at the broad white arrows marked "Polyallene," which would be expected if the resulting mixture included any polyallene homopolymer. Instead the traces show multiple peaks indicating the presence of a true allene/propyne copolymer.

Figures 6A, 6B:
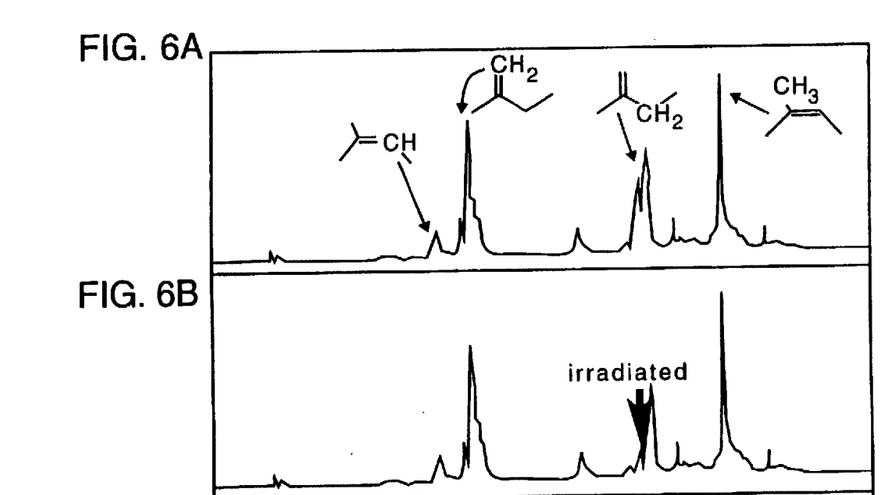
FIGS. 6A to 6E are a series of $^1H$ NMR spectra of the allene/propyne copolymer showing that the predominant isomer in the propyne unit is the cis isomer.
Figure 6C:
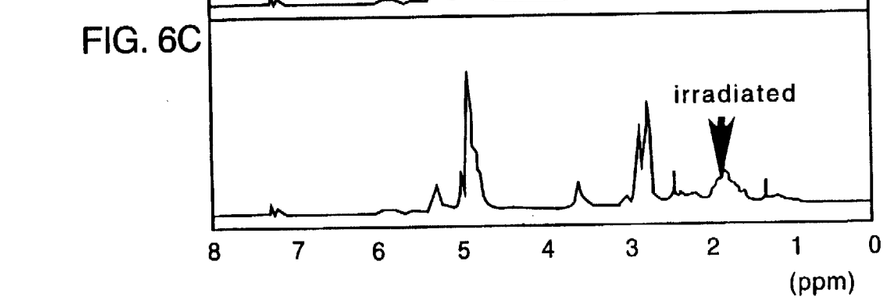
Figure 6D:
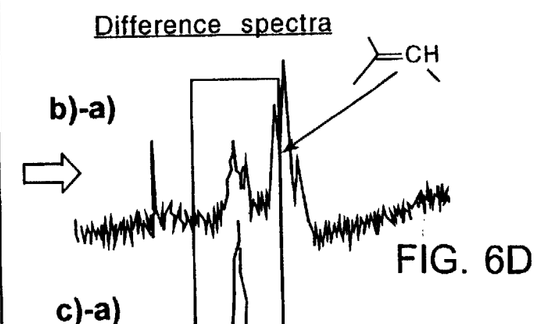
Figure 6E:
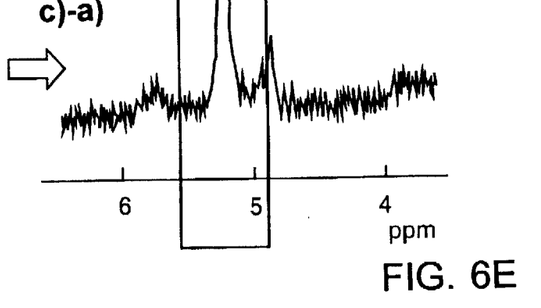

In addition, there is only one $CH_3$ peak, indicating the presence of only one isomer of the propyne unit of the copolymer. This structural observation was confirmed by standard NOE (nuclear Overhauser effect) difference spectra shown in FIGS. 6D and 6E, based on the $^1H$ NMR spectra in FIGS. 6A to 6C. The $^1H$ NMR trace in FIG. 6A was generated from an allene/propyne copolymer at 3 hours at 40° C. The trace in FIG. 6B was generated by irradiating the methylene protons of the allene unit which is adjacent to the propyne unit and then performing the NMR analysis. The trace in FIG. 6C was generated by irradiating the methyl proton of the propyne unit, and then performing the NMR analysis. The difference spectra in FIG. 6D was created by subtracting the trace of FIG. 6A from that of FIG. 6B. The difference spectra in FIG. 6E was created by subtracting the trace of FIG. 6A from that of FIG. 6C. These two traces provide information about proton-proton distance, and indicate that the cis isomer of the propyne unit of the copolymer is the predominant isomer.

Example 2—Allene/Acetylene Copolymerization

In this example the starting monomers allene and acetylene are introduced into the catalyst mixture of Example 1 in a feed ratio of 55 to 45 (mole ratio). The polymerization conditions and catalyst are the same as in Example 1. After stirring at 40° C. for three hours, a copolymer with a molecular weight of about 16,000 daltons (measured by GPC) is produced and can be isolated by precipitation to methanol. Given a starting amount of 0.41 g allene and 0.22 g acetylene, the yield of copolymer will be 0.61 g, and have the formula (n and m defined as above):

Example 3—Allene/1-Pentyne Copolymerization

In this example the starting monomers allene and 1-pentyne ($HC\equiv C-(CH_2)_2-CH_3$) are introduced into the catalyst mixture of Example 1 in a feed ratio of 51 to 49 (mol ratio). The polymerization conditions and catalyst are the same as in Example 1. After stirring at 40° C. for seven hours, a copolymer with a molecular weight of about 32,000 daltons (measured by GPC) is produced and can be isolated by precipitation to methanol. Given a starting amount of 0.39 g allene, and 0.62 g 1-pentyne, the yield of copolymer will be 1.0 g, and have the formula:

Example 4—Allene/2-Pentyne Copolymerization

In this example the starting monomers allene and 2-pentyne ($CH_3-C\equiv C-CH_2-CH_3$) are introduced into the catalyst mixture of Example 1 in a feed ratio of 65 to 35 (mole ratio). The polymerization conditions and catalyst are the same as in Example 1. After stirring at 60° C. for ten hours, a copolymer with a molecular weight of about 14,000 daltons (measured by GPC) is produced and can be isolated by precipitation to methanol. Given a starting amount of 0.51 g allene and 0.47 g 2-pentyne, the yield of copolymer will be 0.93 g, and have the formula:

Example 5—Allene/Phenylacetylene Copolymerization

In this example the starting monomers allene and phenylacetylene ($HC\equiv C-O$) are introduced into the catalyst mixture of Example 1 in a feed ratio of 62 to 38 (mole ratio). The polymerization conditions and catalyst are the same as in Example 1. After stirring at 60° C. for ten hours, a copolymer with a molecular weight of about 25,000 daltons (measured by GPC) is produced and can be isolated by precipitation to methanol. Given a starting amount of 0.5 g allene and 1.18 g phenylacetylene, the yield of copolymer will be 1.5 g, and have the formula:

Example 6—Methyl Allene/Propyne Copolymerization

In this example the starting monomers methyl allene ($CH_3-C=C=CH_2$) and propyne are introduced into the catalyst mixture of Example 1 in a feed ratio of 47 to 53. The polymerization conditions and catalyst are the same as in Example 1. After stirring at 40° C. for four hours, a copolymer with a molecular weight of about 30,000 daltons (measured by GPC) is produced and can be isolated by precipitation to methanol. Given a starting amount of 0.5 g methyl allene and 0.42 g propyne, the yield of copolymer will be 0.92 g, and have the formula:

Uses for the New Copolymers

One important advantage of the new copolymers is their high reactivity for modification. One can incorporate a wide variety of functional groups, e.g., hydroxy, carboxyl, aldehyde, or ester groups, into the new copolymers to provide functional polyolefin-based elastomers. Thus, the new copolymers are highly versatile. For example, small amounts of added hydroxy groups improve the overall hydrophilicity of the copolymer. Added alkylsilyl groups ($-SiR_3$, where R is, e.g., $CH_3$, $C_2H_5$, phenyl, or $OC_2H_5$) improve the compatibility of the copolymer with inorganic materials such as fiberglass.

These copolymers are useful, e.g., as resin modifiers. For example, they can be added to engineering plastics such as nylons and polyesters to provide increased flexibility, reduced brittleness, and increased impact resistance.

In addition, the new copolymers when partially hydrogenated and modified with functional groups provide polypropylenes with those functional groups. These polypropylenes can be used in the manufacture of various parts of automobiles, such as the bumper, and interior trim parts such as dashboards, door trim, and glove compartments. In addition, the new copolymers can be used in polyolefin-based adhesives, and in polyolefin-based membranes and films, e.g., used as protective wrapping.

The new copolymers also can be made highly receptive to paints when small amounts of functional groups such as ester groups are added. In addition, the new copolymers can be cross-linked, which increases their heat resistance, which is very important when used near sources of heat, such as automobile engines.

In addition, the new copolymers are soluble in hydrocarbon solvents such as toluene or benzene, as well as halogenated solvents such as $CHCl_3$ or $CH_2Cl_3$, and oxygen-containing solvents such as THF. This feature allows the copolymers to be easily modified.

The copolymers can also be cast into thin films using standard techniques such as the solvent cast method in which a concentrated copolymer solution (e.g., 1 g copolymer in 1 ml of a solvent such as toluene) is poured onto a glass plate, and the solvent is pumped off to allow a thin film to dry onto the plate.

Other Embodiments

It is to be understood that while the invention has been described in conjunction with the detailed description thereof, that the foregoing description is intended to illustrate and not limit the scope of the invention, which is defined by the scope of the appended claims. Other aspects, advantages, and modifications are within the scope of the following claims.

What is claimed is:

1. A linear copolymer having the formula:

wherein $R_1$ through $R_6$ are, independently, H, an alkyl, an aryl, a phenyl or substituted phenyl, an alkoxy, or an aryloxyl; and wherein x+n is less than or equal to 10,000, and m is less than or equal to 10,000.

2. A copolymer of claim 1, wherein said copolymer is prepared from a mixture of
   (i) alkynes having the formula $R_1$—C≡C—$R_2$; and
   (ii) allenes having the formula:

3. A copolymer of claim 1, wherein said alkyl is $C_aH_{2a+1}$, where a is 1 to 20.

4. A copolymer of claim 1, wherein said alkoxy is $OC_aH_{2a+1}$, where a is 1 to 20.

5. A copolymer of claim 1, wherein x+n is 20 to 2500, and m is 20 to 2500.

6. A copolymer of claim 1, wherein the formula of the copolymer is:

wherein n and m are each less than or equal to 10,000.

7. A copolymer of claim 2, wherein said allene is unsubstituted, and said alkyne is acetylene.

8. A copolymer of claim 2, wherein said allene is unsubstituted, and said alkyne is 1-pentyne.

9. A copolymer of claim 2, wherein said allene is unsubstituted, and said alkyne is 2-pentyne.

10. A copolymer of claim 2, wherein said allene is unsubstituted, and said alkyne is phenylacetylene.

11. A copolymer of claim 2, wherein said allene is $CH_3CH$=C=$CH_2$, and said alkyne is propyne.

12. A method of preparing a copolymer of an allene and an alkyne, said method comprising obtaining a solution of a catalyst in a solvent having the formula:

wherein M is nickel or palladium, and X is a counterion;

adding to the solution a mixture of an allene and an alkyne;

stirring the solution at a temperature of at least −20° C. for a time sufficient to produce a copolymer; and isolating said copolymer from said solution.

13. A method of claim 12, wherein said stirring time is at least 3 hours.

14. A method of claim 12, wherein said temperature is at least 40° C.

15. A method of claim 12, wherein said solvent is toluene.

16. A method of claim 12, wherein said counterion is a carboxylate, or a halogen ion, or a halogen-containing compound.

17. A method of claim 16, wherein said carboxylate is an acetate or a benzoate.

18. A method of claim 16, wherein said halogen ion is fluorine, chlorine, or bromine.

19. A method of claim 12, wherein said catalyst is $[(N^3\text{-allyl})Ni(trifluoroacetate)]_2$ (ANiTFA).

20. A method of preparing a copolymer of an allene and an alkyne, said method comprising obtaining a solution of a catalyst in a solvent, wherein the catalyst is a nickel or palladium complex with a diimine ligand having the formula:

wherein M is nickel or palladium; Y is a halogen, an alkyl, or a solvent; and $R_1$ and $R_2$ are, independently, H, an alkyl, an aryl, a phenyl or substituted phenyl, an alkoxy, or an aryloxyl;

adding to the solution a mixture of an allene and an alkyne;

stirring the solution at a temperature of at least −20° C. for a time sufficient to produce a copolymer; and isolating said copolymer from said solution.

21. A method of claim 20, wherein the Rs are the same.

22. A method of claim 20, wherein the catalyst is in a cationic form and is activated by methylaluminoxane.

23. A method of claim 20, wherein the catalyst is in a cationic form and is activated by an aryl borate anion.

24. A method of claim 20, wherein said solvent is diethyl ether.

25. A method of polymerizing a $C_3H_4$ byproduct of petroleum cracking, said method comprising using said byproduct as the allene and alkyne mixture in the method of claim 12.

* * * * *

UNITED STATES PATENT AND TRADEMARK OFFICE
CERTIFICATE OF CORRECTION

PATENT NO. : 5,747,618

DATED : May 5, 1998

INVENTOR(S) : Bruce M. Novak and Mitsuru Nakano

It is certified that error appears in the above-identified patent and that said Letters Patent is hereby corrected as shown below:

Col 1, line 66 "$R_1-C\equiv-C-$" should be — $R_1-C\equiv C-$ —"

Assignees should be:

Massachusetts, University of

Boston, MA and

Kabushiki Kaisha Toyota Chuo Kenkyusho

Aichi-Ken, 480-11, JAPAN

Signed and Sealed this

Twentieth Day of July, 1999

Attest:

Q. TODD DICKINSON

*Attesting Officer*   *Acting Commissioner of Patents and Trademarks*